(12) United States Patent
Sinsel et al.

(10) Patent No.: US 7,553,389 B2
(45) Date of Patent: *Jun. 30, 2009

(54) METHODS AND APPARATUS FOR PRODUCTION OF COMPOSITE-COATED RIGID FLAT-ROLLED SHEET METAL SUBSTRATE

(75) Inventors: John A. Sinsel, Weirton, WV (US); Mark V. Loen, Steubenville, OH (US); Kenneth H. Speckhals, Wexford, PA (US)

(73) Assignee: ISG Technologies Inc., Richfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/841,723

(22) Filed: May 7, 2004

(65) Prior Publication Data

US 2004/0208991 A1 Oct. 21, 2004

Related U.S. Application Data

(63) Continuation-in-part of application No. 10/191,411, filed on Jul. 9, 2002, and a continuation-in-part of application No. 10/156,471, filed on May 28, 2002, now Pat. No. 7,452,434, said application No. 10/191,411 is a continuation-in-part of application No. 10/156,473, filed on May 28, 2002, now abandoned, which is a continuation-in-part of application No. 09/767,785, filed on Jan. 23, 2001, now abandoned, which is a continuation-in-part of application No. 09/490,305, filed on Jan. 24, 2000, now abandoned.

(60) Provisional application No. 60/468,705, filed on May 7, 2003.

(51) Int. Cl.
*B32B 15/08* (2006.01)
*B29C 47/02* (2006.01)

(52) U.S. Cl. .............. 156/244.19; 156/244.11; 156/244.18; 264/171.14; 264/171.17; 264/171.21; 428/461; 428/463

(58) Field of Classification Search ............... 428/457, 428/458, 461; 156/244.11, 244.23, 244.24
See application file for complete search history.

(56) References Cited

U.S. PATENT DOCUMENTS

| | | | | |
|---|---|---|---|---|
| 4,389,438 A | * | 6/1983 | Ohtsuki et al. | ............ 428/34.2 |
| 4,941,935 A | * | 7/1990 | Gregory | .................... 156/243 |
| 5,674,633 A | * | 10/1997 | Saunders et al. | ............ 428/623 |

(Continued)

*Primary Examiner*—Monique R Jackson
(74) *Attorney, Agent, or Firm*—Berenato, White & Stavish, LLC

(57) ABSTRACT

Methods and apparatus for producing composite-coated rigid flat-rolled sheet metal substrate in which thermoplastic polymeric materials are selected and combined for dual-layer molten-film extrusion presenting a first-contacting tie-layer and an externally-located finish-layer which are simultaneously extruded for a single substrate surface at-a-time; in which tie-layer selection includes an ethylene-glycol modified PET, requiring a substrate-surface temperature between 230° F. and 300° F., and a maleic-anhydride modified polyethylene free of any substrate-surface heating requirement; the tie-layer provides sufficient green-strength-adhesion for a finish-layer selected from PBT, PET, and a combination of PBT and PET; each substrate-surface is separately activated for desired adhesion and separately polymeric coated; dual-surface finishing-processing is carried-out by remelting the coated polymeric materials for completing bonding of the dual polymeric layers on each inorganic-metallic protectively-coated surface of the substrate.

28 Claims, 4 Drawing Sheets

U.S. PATENT DOCUMENTS

| | | | |
|---|---|---|---|
| 5,736,086 A | * | 4/1998 | Jones et al. ............ 264/171.17 |
| 5,919,517 A | * | 7/1999 | Levendusky et al. ........ 427/211 |
| 6,773,217 B2 | * | 8/2004 | Sinsel et al. ................... 413/1 |
| 2001/0009718 A1 | | 7/2001 | Sinsel et al. |
| 2002/0168532 A1 | | 11/2002 | Sinsel et al. |
| 2003/0031859 A1 | | 2/2003 | Sinsel et al. |
| 2003/0152788 A1 | * | 8/2003 | Velliky ....................... 428/461 |

* cited by examiner

METHODS AND APPARATUS FOR PRODUCTION OF COMPOSITE-COATED RIGID FLAT-ROLLED SHEET METAL SUBSTRATE

RELATED APPLICATIONS

This application claims the benefit of U.S. Provisional Application Ser. No. 60/468,705 filed May 7, 2003; and, is a continuation-in-part of co-owned U.S. patent application Ser. No. 10/156,471 entitled "METHODS AND APPARATUS FOR SURFACE PREPARATION AND DUAL POLYMERIC LAYER COATING OF CONTINUOUS-STRIP FLAT-ROLLED SHEET METAL, AND COATED PRODUCT" filed May 28, 2002 now U.S Pat. No. 7,452,434 and of co-owned U.S. patent application Ser. No. 10/191,411 entitled "PROCESSING AND APPARATUS FOR PRODUCTION OF ENGINEERED COMPOSITE COMBINING CONTINUOUS-STRIP SHEET METAL AND THERMOPLASTIC POLYMERS", filed Jul. 9, 2002 as a continuation-in-part of co-owned U.S. patent application Ser. No. 10/156,473 (now abandoned), filed May 28, 2002, entitled "PROCESSING AND APPARATUS FOR PRODUCTION OF ENGINEERED COMPOSITE COMBINING CONTINUOUS-STRIP SHEET METAL AND THERMOPLASTIC POLYMERS", as a continuation-in-part of co-owned (now abandoned) U.S. patent application Ser. No. 09/767,785, entitled "POLYMERIC COATED METAL STRIP AND METHOD FOR PROCESSING SAME", filed Jan. 23, 2001 as a continuation-in-part of co-owned (now abandoned) U.S. patent application Ser. No. 09/490,305 entitled, "POLYMERIC COATED METAL AND METHOD FOR PRODUCING SAME", filed Jan. 24, 2000.

INTRODUCTION

This invention relates to coating flat-rolled sheet metal, polymeric coating methods, polymeric coating apparatus, and composite-coated work product. In its more specific aspects, this invention is concerned with selecting rigid flat-rolled sheet metal substrate presenting an inorganic-metallic protective coating for each planar surface of the substrate; and, with molten thin-film extrusion of dual-layer thermoplastic polymeric materials for augmented combination of metallurgical and polymeric properties in the production of an engineered composite-coated flat-rolled sheet metal work product.

OBJECTS OF THE INVENTION

Important objects involve selecting: flat-rolled sheet metal substrate, an inorganic-metallic protective coating for each surface which is capable of being activated for in-line adhesion, and of dual-layer polymeric coating materials so as to increase performance and durability of work product for fabricating opportunities.

A related object involves pre-selecting polymeric materials for enhanced adhesion of a molten-thin film tie-layer, which first contacts a selected inorganic metallic-protective surface and, also, for interlinking with a selected molten polymeric materials, co-extruded as a finish-layer.

A further specific object involves selecting thermoplastic polymeric materials capable of molten thin-film extrusion, selecting an inorganic metallic protective surface for flat-rolled sheet metal; and, with co-extruded exterior-finish thermoplastic polymeric materials selected for surface properties complementing those of a selected sheet metal.

A further related object is achieving desired surface coverage of polymeric coating materials by utilizing continuous line coating operations correlating substrate presentation with first-contacting tie-layer polymeric materials selections; and, achieving uniform thickness gauged dual-layer polymeric material.

The above and other objects and contributions of the invention will be disclosed in more detail in describing embodiments of the accompanying drawings.

DETAILED DESCRIPTION OF THE DRAWINGS

Figure 1:
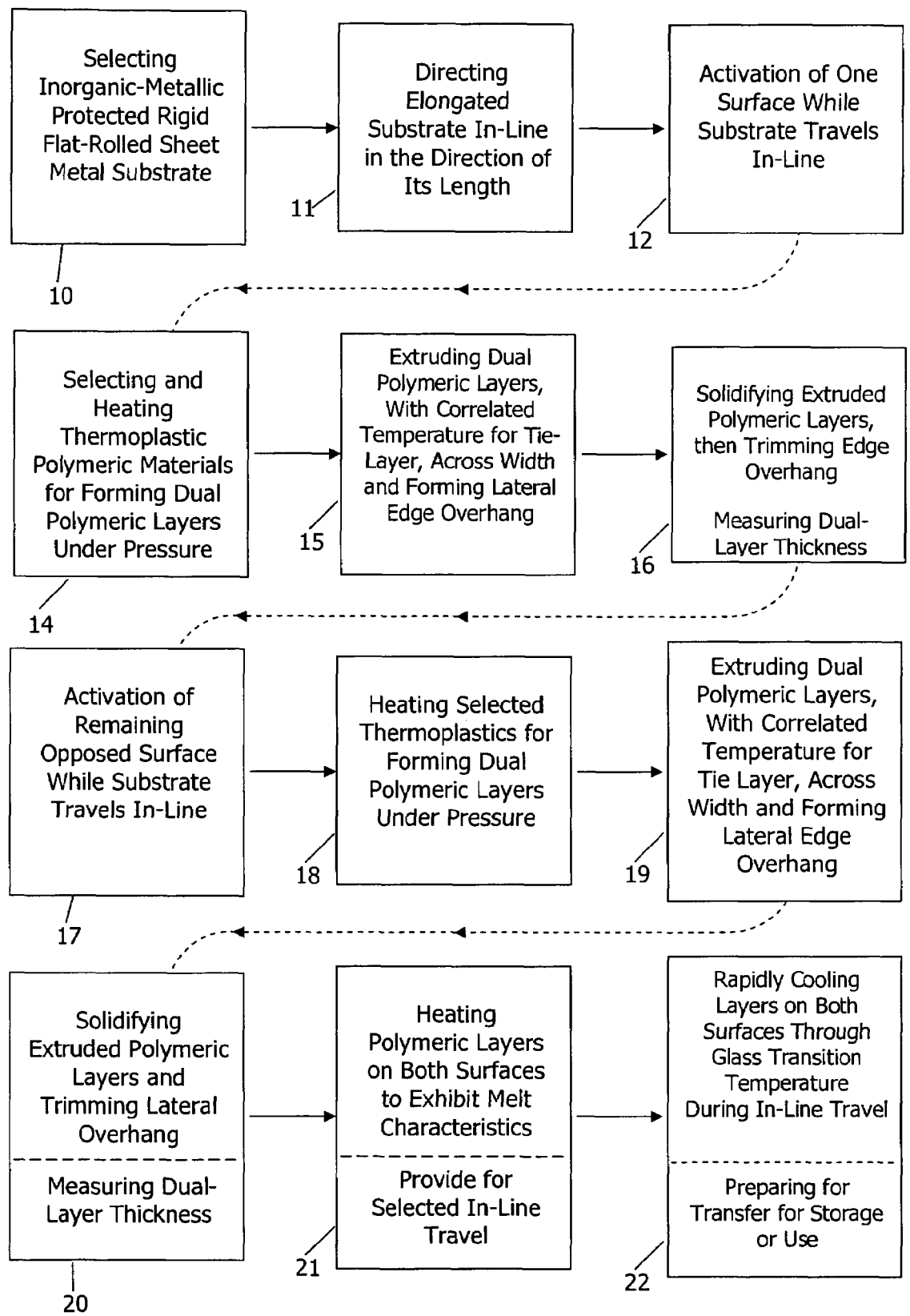
FIG. 1 is a box-diagram flow-chart presentation for describing production processing steps of the invention.

Pre-selected rigid flat-rolled sheet metal continuous-strip substrate with inorganic corrosion-protected opposed planar surfaces is supplied at station 10 of FIG. 1. Sheet surface thickness gauge is pre-selected to be greater than foil gauge for the selected sheet metal for directing rigid sheet in-line at station 11 for travel in the direction of its length. The flat-rolled sheet metal is selected to contribute desired mechanical properties, such as tensile strength, impact hardness, and ductility for composite coated work product, for fabrication into finished market-usage products, such as housings for appliances, panels for transportation equipment, building construction, and the like. Pre-selecting of polymeric finish-surface polymeric materials concentrates on contributing to formability, abrasion-resistance and impact-hardness properties for optimum performance and durability of the composite-coated sheet metal.

Present concepts involve selecting formulated thermoplastic polymeric materials which are compatible and capable of combining for molten film co-extrusion; and, which can be relied on for bonding an inner-located polymeric material with an activated metallic-surface and interlinking with externally-located finish-layer polymeric materials. Further concepts involve in-line operations which enable carrying-out a plurality of distinct operations, in sequence, separately on each opposed metallic surface, prior to combined finishing processing of both surfaces in-line.

An inorganic-metallic surface coating is selected so as to protect each of the pair of substantially-planar opposed substrate surfaces, extending widthwise between lateral edges, for coating enhancing of dual-layer polymeric materials.

In-line surface activation for polymeric coating of solely a single metallic surface is carried out at station 12. That single-surface activation involves open-flame impingement which burns-off light surface oil and associated debris, if any, while initiating surface-activation by controlling chemical content of the impinging flame producing an oxidizing reaction for enhancing polymeric adhesion. Corona-discharge ionization of the gas, contiguous to that single metallic surface, contributes to sustaining surface-activation for enhanced polymeric adhesion. Open-flame treatment, corona-discharge treatment, and/or their combination can be selected for activating a surface to enable a chemical bonding of related organic polymeric material with an inorganic activated metallic surface. Surface-activation methods and apparatus are described in more detail in relation to subsequent figures.

Thermoplastic polymeric materials, pre-selected at station 14 of FIG. 1, are formulated for co-extruding dual-layers, for performing dual-functions, as associated with said single activated-surface. During deposition, the first-contacting layer of the co-extruded-film comprises a "tie" layer. Formulations for thermoplastic polymeric materials have been found for carrying out desired surface coverage; which include: in-line processing capable of presenting an activated-surface, at a temperature which is correlated with the selected tie-layer polymeric materials for desired surface coverage purposes of the activated-surface. For example, ethylene-glycol modified polyethylene terephthalate (PET) comprises a tie-layer selected for desired in-line travel properties surface coverage and polymeric linking functions, which utilizes a correlated-temperature for the activated-surface of about 230° F. to about 300° F. Another contribution of the invention involved finding a polymeric material formulation for the tie-layer, capable of fulfilling those desired purposes, while providing for desired surface coverage when presenting an activated-metallic-surface at ambient temperature. For example, maleic anhydride modified polyethylene has been found which fulfills desired tie-layer functions; and, enables desired coverage of an activated-surface free of any surface heating requirement.

Providing desired "tie-layer" characteristic, while eliminating any requirement for pre-heating an activated-surface, has advantages during in-line operations. Being free of heating requirements for the activated-surface helps to decrease heat-removal requirements fro the sheet metal substrate, during in-line travel, for solidifying the molten extruded polymeric materials; also, minimizes handling problems during in-line operations, and facilitates multiple polymeric selections, when activating and presenting a single corrosion-protected substrate surface at-a-time for polymeric coating operations.

An important contribution of the tie-layer is providing for desired in-line travel between organic polymeric materials and an inorganic metallic surface of the flat-rolled sheet metal substrate. A further function for the tie-layer is polymeric interlinking with molten co-extruded polymeric material selected for exterior-finish properties which complement properties of other components of the composite-coated flat-rolled sheet metal work product.

In a specific embodiment, the polymeric exterior-finish polymeric material is selected from the group consisting of (i) a combination of polybutylene terephthalate (PET) and polyethylene terephthalate (PET, (ii) PBT, and (iii) PET. Polymeric materials for the externally-located finish-layer are selected for such properties as surface toughness, abrasion-resistance, or other properties helpful market-usage industrial fabrication, and use, of the composite-coated work product; that is, added surface finishing, after fabrication, can be substantially eliminated; which is part of the objective to properly combining sheet metal properties and properties of selected composite coating combinations which contribute to increasing performance and durability of composite-coated market-usage work product.

At station 15 of FIG. 1, the selected polymeric materials are extruded simultaneously, presenting a selected tie-layer initially contacting a single activated-surface presented at a surface temperature correlated with the selected polymeric material. That tie-layer and a compatible polymeric material for the externally-located finish-layer are co-extruded widthwise of the elongated substrate so as to extend to its lateral edges; and, extruded further establishing dual-layer polymeric material overhang, beyond each lateral edge of a single in-line activated-surface.

The molten polymeric materials, as co-extruded presenting dual-function layers, are solidified at Station 16. That solidification is initiated in-line by the tie-layer contacting the single activated-surface of the rigid sheet metal; the latter is at a temperature significantly less than the extrusion temperature for the molten film; and, less than the melt temperature for the polymeric materials. Additionally, in-line contact of the polymeric external finish-layer with a controlled in-line temperature-modulating surface augments heat removal for such solidification; such added heat removal means are disclosed in more detail in relation to later apparatus presentations.

In-line heat-removal is selected at Station 16 to achieve desired solidification of the polymeric materials at the selected in-line production travel rate; taking into consideration correlated temperature of the substrate surface based on selection of the tie-layer polymeric formulation.

Trimming solidified lateral-edge polymeric-overhang at each lateral edge is also carried out at Station 16. Extruding and trimming polymeric overhang contribute to uniform polymeric thickness across strip width. Polymeric coating thickness can also be measured at Station 16, so as to enable feedback data for maintaining substantially-uniform desired coating thickness on the single activated-surface during in-line operations.

The remaining opposed corrosion-protected surface of the substrate is then activated while traveling in-line at Station 17 of FIG. 1. Surface-activation is carried-out, as described in relation to the first activated-surface, by selecting from the group consisting of open flame treatment, corona-discharge treatment, and a combination thereof. The number of open-flame burners and/or corona-discharge units, extending across strip width, is selected based on line speed and surface conditions. The oxidizing action on the surface causes loss of surface electrons which facilitates a chemical bonding of the polymeric tie-layer, which is organic with the inorganic metallic protective surface during in-line travel.

Thermoplastic polymeric materials, formulated as described, are supplied, then heated above melt temperature and pressurized, as combined, presenting a tie-layer and externally-located finish later at Station 18 of FIG. 1. The tie-layer polymeric formulations are utilized with a correlated-temperature for the activated-surface enabling desired molten film surface coverage. For example, the ethylene-modified polyethylene terephthalate (PET) utilizes heating of the activated-surface to a temperature in the range of about 230° to about 300° F.; whereas, an anhydride-modified polyethylene utilizes an ambient temperature surface, free of any heating requirement, for desired coverage of the activated-surface. The selected tie-layer provides green-strength adhesion with the metallic-surface for in-line travel of the dual-layers with the substrate.

The selected polymeric materials for the dual-function layers are co-extruded under pressure at Station 19. The selected polymeric formulation for the tie-layer contacts the activated metallic surface for adhesion with that surface; while also providing interlinkage with the selected polymeric material for the externally-located finish-layer; the latter is in overlapping and co-extensive relationship with the inner-located tie-layer. At Station 19, those combined polymeric materials are extruded simultaneously widthwise of the remaining activated surface; while also extending co-extrusion to produce a polymeric overhang at each lateral edge of the moving substrate.

Solidification of the molten thin-film is initiated by contact at the tie-layer with the activated inorganic metallic surface at Station 20; and, heat removal is augmented by contact of the finish-layer polymeric material with an in-line surface at a controlled-temperature. That in-line travel and temperature control are described in more detail in relation to later description of apparatus of the invention. Following solidification of the extruded layers, polymeric overhang at each lateral edge is trimmed at Station 20.

Extruding a polymeric overhang, solidifying and trimming removal of that overhang contribute the capability for obtaining a uniform polymeric coating thickness across on each surface. That is, a tendency for "necking-in" of polymeric materials had been found to exist near the terminating ends of an elongated molten film extrusion. That potential edge build-up problem has been eliminated by depositing an overhang of polymeric materials beyond each lateral edge of the substrate; and, after solidification, trimming that overhang. The resulting coating thickness across substrate width can then be substantially uniform; that enables coating thickness measurements at Station 20 which can be used to provide feedback data for maintaining desired uniform-coating-thickness extrusion on that surface during in-line operations.

Finishing processing steps for the dual-layer polymeric materials, on each surface, are initiated at Station 21. The solidified polymeric materials on both surfaces are heated so as to establish melt temperature characteristics substantially-simultaneously. High-frequency induction heating helps to rapidly increase the temperature of both exterior metallic surfaces of the substrate. Heating of those surfaces, in turn, can promptly establish melt-temperature for the polymeric materials on each metallic surface during in-line travel. A combination of induction heating of the metal substrate, with penetrating infra-red heating externally-applied to the polymeric materials can be used to contribute to achieving uniformity of heating throughout the polymeric layers; and, also, for example, can enable decreasing induction heating for a composite-coated tin-plated flat-rolled steel product; thus avoiding induction-heating such a surface to a temperature which melts the tin plating. The combination of high-frequency induction heating and infra-red heating can also be helpful for establishing melt-temperature characteristics, for polymeric materials on both surfaces at production line speeds, which can extend above about five hundred feet per minute to about eight hundred feet per minute.

Selected travel of the polymeric coated substrate, at finishing-process temperature, is carried out at Station 21 prior to initiating coating. That in-line travel interval facilitates full coverage bonding of the tie layer with the topography of the metallic coating, on each opposed surface; and, also contributes to interlinking of both dual-layer polymeric materials on each respective activated metallic surface.

After holding the dual-function polymeric materials at finishing temperature, on both substrate surfaces, for selected in-line travel as indicated at Station 21, the polymeric materials on each surface are rapidly cooled through glass transition temperature at station 22 of FIG. 1. Rapid cooling through glass-transition temperature provides amorphous characteristics throughout the polymeric coating materials. Amorphous polymeric coating characteristics contribute to desired fabricating functions for the composite-coated product; especially in industries which involve fabricating of composite-coated selected flat-rolled sheet metal for containers, appliances, transportation equipment, and building structures. After rapid cooling, the composite coated work product is prepared for shipping, by coiling or preparing packs of cut sheets, at station 22 of FIG. 1.

Figure 2:
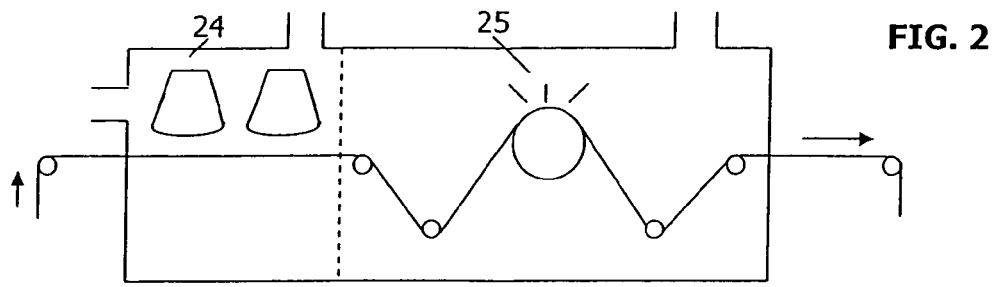
FIGS. 2 through 4 are a schematic continuous-in-line view, partially in cross-section, for describing the apparatus of the invention; and in conjunction with FIG. 1, for describing sequential in-line handling.

Surface-activation apparatus, of FIG. 2, as shown in a cross-sectional vertical plane which is oriented perpendicularly to the substantially-planar elongated flat-rolled metal substrate surface, and extends in parallel relationship to the longitudinal direction of substrate travel. Rows of open-flame impingement burners, extend widthwise of the substrate, within flame-impingement chamber 24. The number of burner rows is selected dependent on line speed and condition of the strip surface. A single-surface at a time is activated for polymeric coating of that surface. That arrangement facilitates continuous-line operations; and, also, enables selecting differing polymeric materials for each opposed surface in continuous-line operations. The open-flame treatment burns-off light surface oils including associated debris, if any; and, activates the surface for enhancing polymeric adhesion.

The content and action of the flame impingement can implement chemical bonding of the organic polymeric tie-layer material with the inorganic metallic surface. The inorganic-metallic protective coating is selected and carried out to enable surface activation for desired polymeric adhesion for the composite-coated work product. Such inorganic protective processing for the selected flat-rolled sheet metals is described, with tabulated data, in relation to later expanded cross-sectional views of composite-coated work product.

In chamber 25 of FIG. 2, a selected number of rows of corona-discharge electrodes extend widthwise of the substrate. Corona discharge takes place across full-surface width for establishing, and/or maintaining, activation of the single surface for polymeric coating. Corona discharge ionizes gas contiguous to the metallic substrate surface, safely, by selecting electrical energy level per square foot of surface area. The gas ionizing means and energy level are selected based on strip width and the line-speed selected for continuous-line operations. Continuous-line operations provide for polymeric coating of both surfaces, one-at-a-time, in a single line; and, a separate pre-treatment apparatus is provided in-line for each surface.

Figure 3:
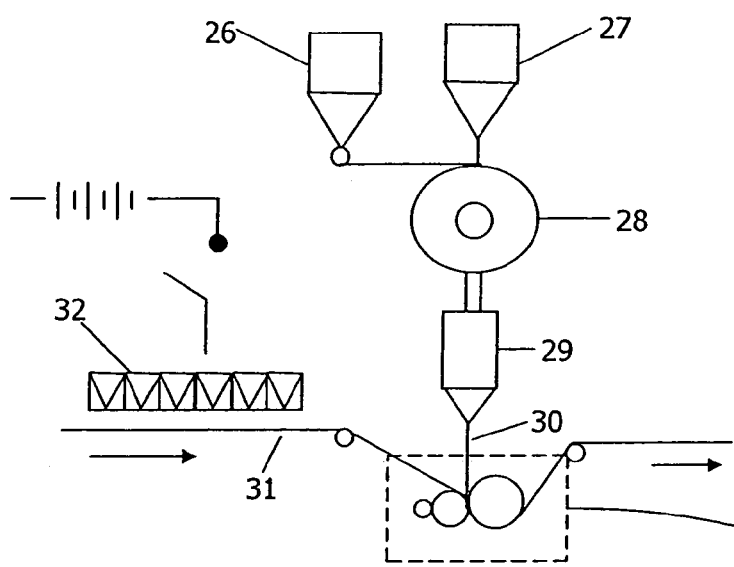

FIG. 3 shows an enlarged view of extrusion and associated apparatus provided for each surface, in continuous line operations. That apparatus receives, prepares and extrudes polymeric materials. The polymeric materials, as selected, for each layer, are supplied separately as solid pellets to hoppers 26 and 27, respectively of FIG. 3. Thermoplastic polymeric materials as formulated are selected to be compatible and capable of combined molten film extrusion so as to present an inner-located layer of polymeric material for bonding with a metallic activated-surface; and, with an externally-located finish-layer polymeric material. The inner-located polymeric material adheres to the activated-surface so as to provide green strength adhesion for in-line travel of both layers. The polymeric materials are also selected to provide polymeric surface properties which, complement the metal component properties of the composite-coated product, and augment performance and durability of market-usage products.

The thermoplastic polymeric materials are separately supplied and melted, then, heated and pressurized in preparation for and during combination for extrusion. In FIG. 3, the polymeric formulation for the inner-located tie-layer portion is directed from hopper 26; and, the polymeric material for the external-finish layer portion is directed from hopper 27; each polymeric material is fed into its respective melting and pressurizing means of feed section 28. Each thermoplastic polymeric material continues to be heated and pressurized during movement through a combined-polymer feed chamber 29; which leads to extrusion die 30, for simultaneous thin-film extrusion as combined polymeric materials; each layer is distinctly located for functioning, on each opposed surface, of the extruded film.

In FIG. 3, the activated-surface of substrate 31 travels in-line contiguous to a penetrative radiation heating source, such as infra-red surface heater 32; which can be energized by switch means as shown. The use of surface heater 32 is dependent on the formulation selected for the tie-layer of the dual-layer polymeric materials. For example, ethylene-modified polypropylene terephthalate (PET), utilizes a correlated activated-surface temperature of about 230° F. to about 300° F. in order to obtain desired coverage of the activated-surface. A maleic-anhydride polyethylene tie-layer formulation has been found to provide desired characteristics for bonding with an activated metallic surface at ambient temperature; that is, use of a surface heater 32 is not required. Characteristics for an inner-located tie-layer are also described in more detail in relation to expanded cross-sectional views of work product produced in accordance with the invention.

The combined molten polymeric materials continue to be heated and pressurized in extrusion die 30; which presents oriented to extend widthwise of the elongated substrate. The thermoplastic materials are heated significantly above melt temperature for extrusion through that opening of die 30, as an elongated narrow-opening nozzle as widthwise-oriented in relation to the activated surface.

Figure 3A:
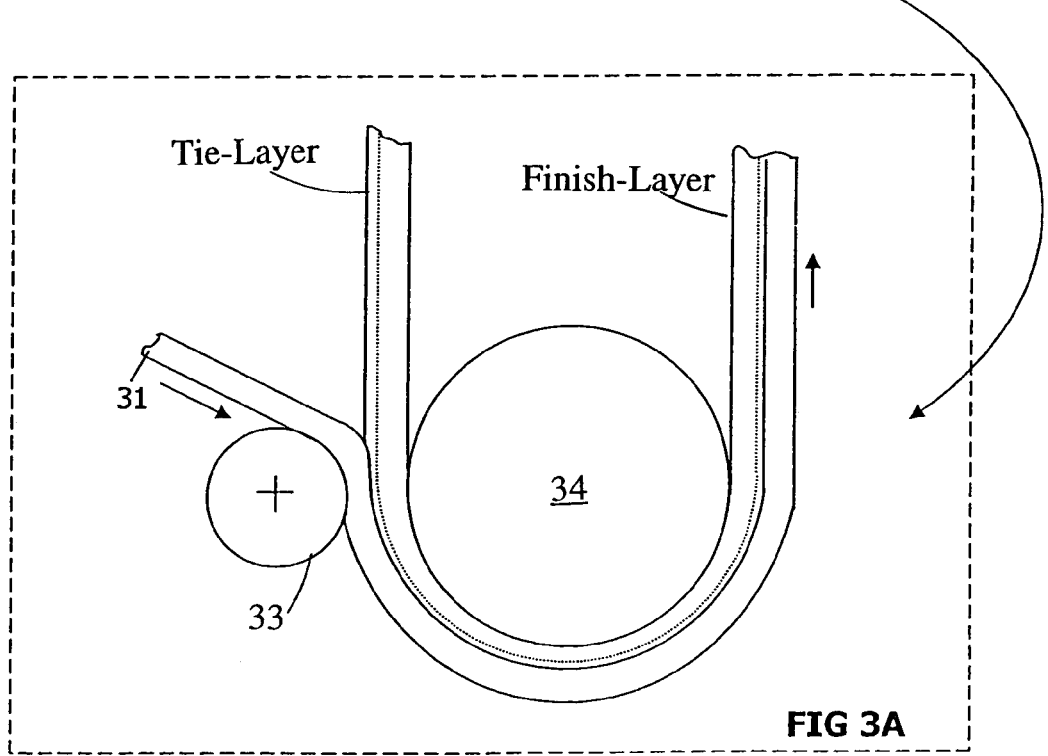

Referring to FIG. 3A, which is an expanded view of a portion of FIG. 3, substrate 31 is directed toward a coating nip, which is defined between pressure-roll 33 and temperature-modulating roll 34. Die 30 extends toward and extrudes the combined polymeric materials molten-film into that coating nip. The inner-located molten tie-layer of the extrusion contacts the activated-surface of substrate 31; and, the polymeric material for the externally-located finish-layer, which is in overlapping, co-extensive relationship with the tie-layer, is extruded into that coating nip so as to contact the peripheral surface of temperature-modulating roll 34 of FIG. 3A.

Each layer is quantitatively selected and the combined polymeric materials are heated to a temperature selected between about 475° F. to about 550° F. for providing for desired molten thin-film extrusion. The inner-located polymeric tie-layer, as extruded from die 30, is substantially thinner than the polymeric externally-located finish-layer. Polymeric solidification is initiated by contact with the activated-surface of rigid flat-rolled sheet metal substrate 31, which is free of a heating requirement, presenting an ambient temperature of about seventy to about ninety-five degrees Fahrenheit. Roll 32 exerts nominal pressure against substrate 31; urging contact of the activated-surface with the thin tie-layer portion of the extrusion and between the dual-layers 34 and 35 while also urging contact of finish-layer 35 with the in-line traveling peripheral surface of temperature-modulating roll 33.

The peripheral surface of temperature-modulating roll 33 is temperature-controlled. That peripheral surface is preferably coated with a thin ceramic, covering a highly heat-conductive metal roll such as nickel-chromium steel. One method for adequately cooling the peripheral surface of temperature-modulating roll 34 is circulating coolant internally of the roll; the peripheral-surface temperature for roll 33 is maintained substantially in the range of about fifty to about seventy-five degrees Fahrenheit (50° F. to about 75° F.) when using a tie-layer requiring heating of the activated surface to a temperature in the range of 230° F. to 300° F.

That temperature implements solidification of the entire thickness of the combined molten extrusion during travel in-line on a selected portion of the peripheral-surface, as indicated, that temperature also facilitates separation of the coated substrate from the thin ceramic surface of Roll 34 for in-line travel, while enabling desired conductive heat transfer for solidifying the polymeric combination during contact with roll 34.

Figure 4:
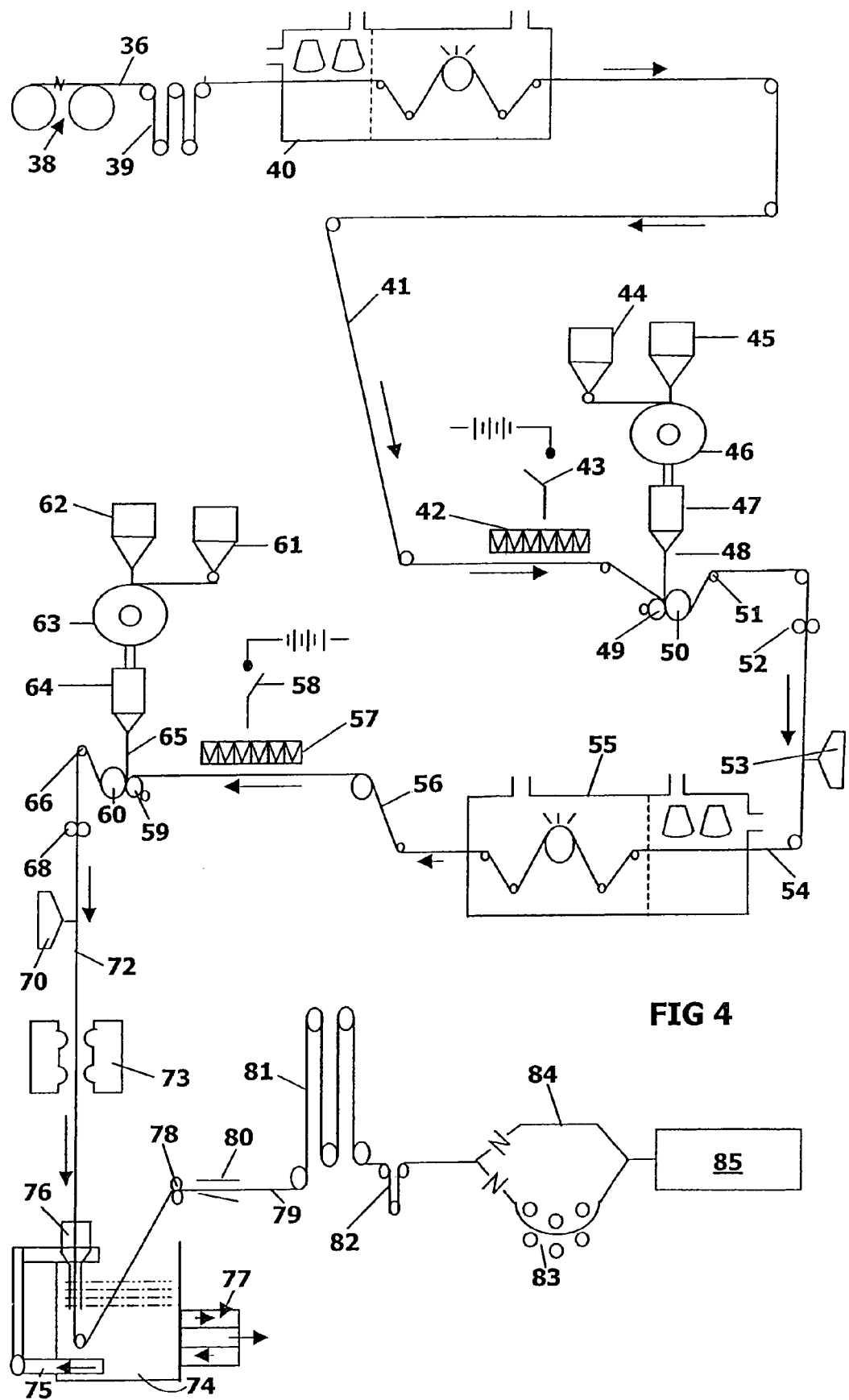

In continuous-line apparatus, as shown in the general-arrangement view of FIG. 4, each opposed substrate surface is activated separately, followed by extrusion of the combined polymeric materials for association with that single activated-surface. Continuous-strip 36, formed by welding together leading and trailing ends of coiled sheet metal substrate, in coil ramp 38, is fed through looping pit 39; the latter enables operation of the coil-ramp apparatus for welding together continuous-strip for in-line operations; free of interruptions while changing-coils for feeding sheet metal into the line.

Pre-treatment apparatus 40, described in detail in relation to FIG. 2, includes two rows of open-flame burners and corona-discharge electrodes acting across the surface being activated. The metallic corrosion-protection coating for opposed surfaces of the selected flat-rolled sheet metal is selected so as to be capable of activation, by activation means as selected.

Dependent on the selected polymeric material for the inner tie-layer portion of single-surface activated strip 41, an infra-red heater 42, operated in cooperation with switch 43, enables surface heater 42 to be turned on, if required. Ethylene-glycol modified PET, for example, utilizes a correlated-temperature for the activated-surface of about 230° F. to about 300° F., as heated by heater 42. A thermoplastic polymeric formulation of maleic-anhydride modified polyethylene enables utilizing an ambient-temperature activated-surface; that is free of a surface heating requirement.

Formulated thermoplastic polymeric materials are supplied as solid pellets separately for each layer; hopper 44 receives the inner-located tie-layer polymeric material; and, hopper 45 receives for the externally-located finish-layer polymeric material of the combined extrusion. The polymeric materials are melted in heating apparatus 46. Heating and pressurizing of the combined polymeric materials then continues in feed chamber 47 leading to narrow-opening die 48 for extrusion at a temperature, selected in a range of about 450° F. to about 550° F. for thin-film extrusion.

A polymeric coating nip (as better seen in FIG. 3A) is defined between roll 49 and temperature-modulating roll 50; while rotating as indicated by the direction of strip travel in FIG. 4. Strip 41 travels toward roll 49 and into that defined coating nip, presenting its activated-surface for contact with the thin tie-layer of the combined extrusion from die 48. The tie-layer polymeric material is selected to have sufficient green-strength adhesion to provide for combined travel of the dual-layers with the activated-surface of strip 41.

The selected polymeric formulation for the externally-located finish-layer, of the extruded film is in overlaying and co-extensive relationship with the inner-located tie layer, of the combined extrusion, during travel of substrate 41 into the defined coating nip. Nominal pressure is exerted by roll 49 on that combination of strip and polymeric materials while in the defined nip. The polymeric materials are extruded from the narrow-opening of die 48 to extend across strip width; and, further, to extend beyond each lateral edge of the strip, forming a polymeric overhang.

The activated-surface of the strip is at a temperature substantially less than extrusion temperature, and less than melt temperature for the thermoplastic polymeric materials, such that polymeric solidification is initiated by contact of the inner-tie portion with the activated-surface. In addition, the peripheral surface of temperature-modulating roll 50 is maintained within a selected range, by circulating coolant internally, so as to solidify the polymeric layers during contact of the externally-located polymeric finish layer with an in-line peripheral-surface portion of roll 50; the solidified single-surface polymeric coated product then separates from roll 50 for in-line travel toward roll 51.

Solidified polymeric overhang is removed at trimmer means 52; and, the polymeric coating thickness is measured by thickness gauge 53. The thickness gauge data can provide feed-back data automatically controlling the extrusion means; or, can be communicated directly for use by the line operator so as to help maintain uniform polymeric coating thickness, on the single-coated surface, during in-line operations.

Single-surface polymeric-coated strip 54, traveling as indicated, presents its remaining non-polymer-coated surface for activation in pre-treatment apparatus 55. Rows of open-flame burners burn-off light surface oil and associated debris, if any, as well as activate the surface for enhanced polymeric adhesion. Also, rows of corona-discharge electrodes extend across strip width, so as to implement, or augment, that surface activation.

Strip 56, presenting such activated-surface, is directed for travel contiguous to surface-heater 57. When required, dependent on selection of the polymeric formulation for inner tie-layer of the combined extrusion film, infra-red surface heater 57 can be energized by means of power-source switch 58. Strip 56 is then directed toward a coating nip (as better seen in FIG. 3A) defined between roll 59 and temperature-modulating roll 60.

Selected formulated thermoplastic polymeric materials are separately supplied; as solid pellets for the inner-located thin-film tie-layer portion of the combined extrusion, and as solid pellets for the overlapping and co-extensive finish-layer to hoppers 61 and 62, respectively. Each polymeric material is melted at heating apparatus 63; heating and pressurizing continue in chamber means 64 leading to extrusion die 65 which presents an elongated narrow-opening oriented widthwise of strip 56.

Strip 56 contacts pressure-roll 59, for entry into the coating nip defined between roll 59 and temperature-modulating roll 60. The polymeric material for the inner-located tie layer of the extrusion contacts the activated- surface of strip 56; and, the externally-located finish-layer polymeric material contacts temperature-modulating roll 60. Nominal pressure is exerted by pressure-roll 59 urging their combination during travel through the defined coating nip.

The peripheral-surface of temperature-modulating roll 60 is maintained at a selected temperature; as determined by the tie-layer formulation, by circulating such coolant internally for completing solidification of the selected dual-layer polymeric materials for departure from roll 60 toward roll 66. Solidified polymeric overhang, extending beyond each lateral edge of the strip is removed by trimming means 68; and polymeric-coating thickness on such surface, is measured at thickness gauge 70; the latter can use infra-red or other penetrative electromagnetic energy. Feedback of polymeric thickness can be directed either electronically to the polymeric feed means, or to a line operator for control, so as to maintain uniform polymeric coating on that single-surface coating during in-line operations.

Continuous-strip 72, with polymeric coatings on each surface, is directed for finishing-processing which are initiated by remelting the polymeric materials on each surface in heating means 73. High-frequency induction heating concentrates heating at each surface of the metal strip, and facilitates remelting at line speeds from 500 to 800 fpm. Heating means 73 can also include infra-red heating means for penetrative heating from the direction of each external surface, for substantially uniform heating and remelting of the polymeric materials on each surface. Strip travel, with remelted dual polymeric materials on each surface, continues in-line as indicated, to permit augmented bonding with the metallic-protective coating and between the dual-layer polymeric materials on each opposed surface.

The remelted polymeric layers are then rapidly-cooled, through glass-transition temperature utilizing quench bath 74, and associated means, so as to produce amorphous characteristics throughout the polymeric materials on each surface. Cooling of quench solution, which can be de-ionized water or tap water, can be augmented by pumping of the cooling solution through line 75 to re-entry portion 76, which directs the cooling solution so as to provide laminar flow on each surface during strip travel. Also, a closed heat-exchanger system 77 can be utilized to remove heat from the bath solution, as needed, dependent on line speed.

Wiper rolls 78 return cooling solution from the exiting polymeric coated strip 79 to bath 74; and, blower 80 dries the surfaces of strip 79. Looping tower 81 and bridle-roll station 82 provide for handling of continuous-strip 79 in preparation for shipment. Corona discharge of the polymeric coating can, optionally, be carried-out on one or both polymeric coated surfaces at unit 83 for purposes of augmenting printing on a selected market-usage product. Or, the dual polymeric-material coated strip 79 can be directed, by means of travel path 84, to station 85, where the composite-coated material is prepared for shipment; such as: by coiling or being cut and formed into coated-sheet stacks.

Flat-rolled sheet metal, corrosion-protective metallic coating, and the dual thermoplastic polymeric materials are each selected and combined to supply composite-coated work product to selected industries for fabricating surface-finished products, or portions of surface-finished products, for assembly.

Figure 5:
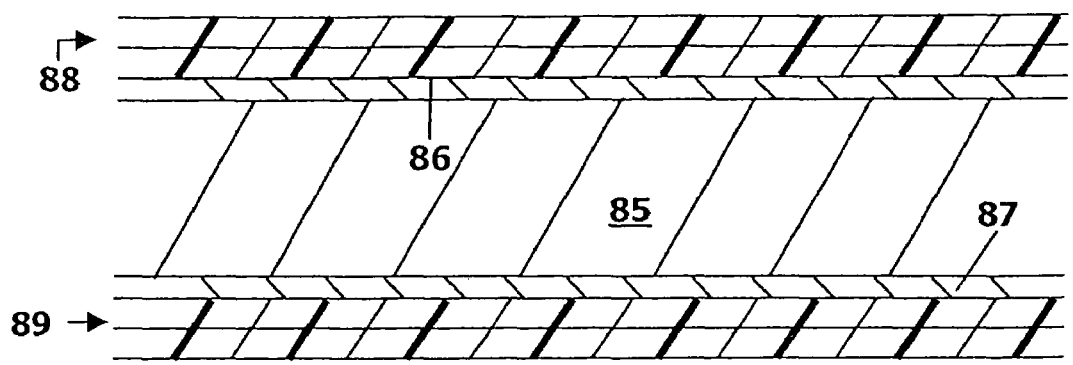
FIGS. 5 through 7 are enlarged cross-sectional views for describing specific polymer-coated metal embodiments of the invention.
Figure 6:
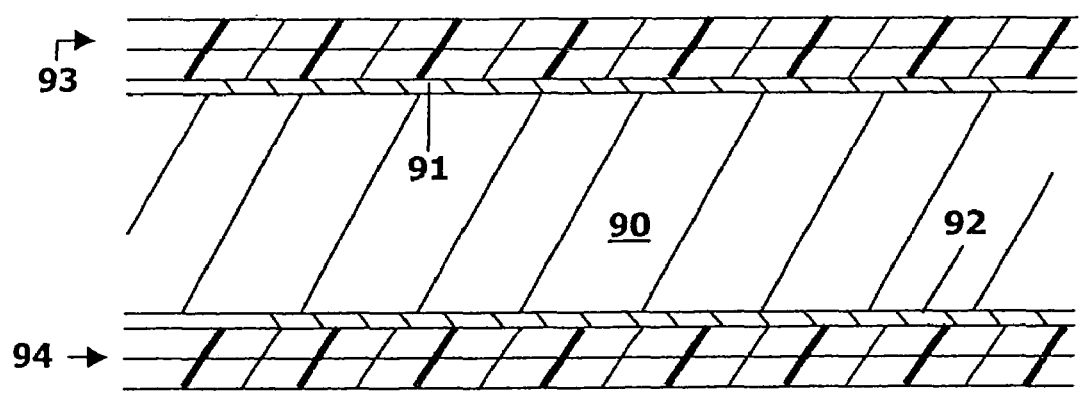
Figure 7:
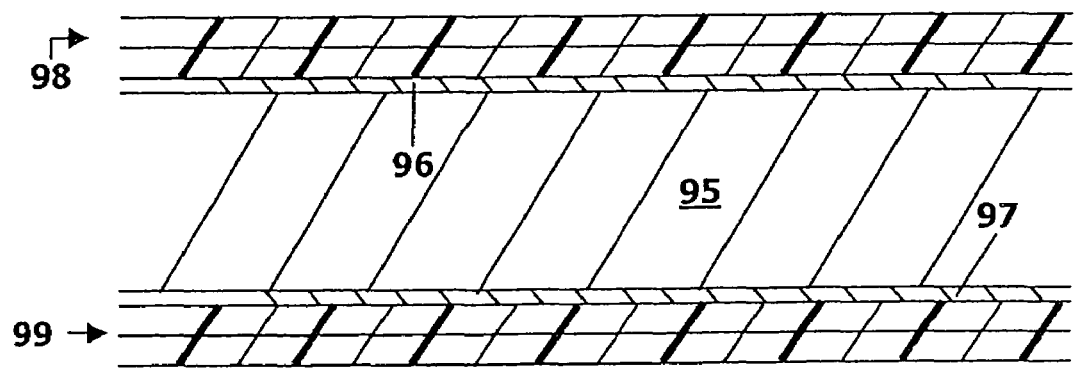

Corrosion-protection is selected, for rigid flat-rolled sheet metal, which is capable of being activated for polymeric adhesion pre-treatment. Both sheet-metal surfaces are corrosion-protected; and each surface is coated with dual-function polymeric materials, as described in relation to FIGS. 1-4. The flat-rolled sheet metal is selected with a thickness gauge greater than foil-gauge, for the selected sheet metal. As shown in FIGS. 5-7, each surface of the rigid sheet metal includes a metallic corrosion-protection coating, as well as dual-functioning polymeric materials.

Referring to the expanded cross-sectional view of FIG. 5, rigid flat-rolled low-carbon steel 85 having a carbon content of about 0.2% to about 3.5% includes single-reduced flat-rolled steel with a tensile strength of about 40,000 to 60,000 psi; or, double-reduced, without an intermediate anneal, flat-rolled steel having a tensile strength of about 80,000 to 100,000 psi. Surface oxidation is removed by acid pickling, or caustic-solution cleansing steps, before coating an inorganic-metallic protective coating. Coated flat-rolled steel coils, as disclosed herein, can be wrapped for shipment as shown in co-owned U.S. Pat. No. 5,941,050, issued Aug. 24, 1999, which is included herein by reference.

Thickness gauges for flat-rolled steel 85 of FIG. 5 metallic corrosion-protection 86, 87 for each respective steel surface are selected from the following table:

TABLE I

| Steel Thickness | Inorganic-Metallic | Coating |
|---|---|---|
| about .004" to about .015" | electrolytic plated tin measured in pounds per base box, which equals 33,360 sq. in. | about .025 to about 1.35 lb/bb |
| same | TFS (tin-free steel); electrolytic plated chrome and chrome oxide | about 3 to 13 mg/ft$^2$ about .7 to 2.5 mg/ft$^2$ |
| same | cathodic dichromate dip-coating through electrolytic coating | about 50 mg/ft$^2$ to about 600 mg/ft$^2$ |
| same | electrolytic plated zinc | about .025 oz/ft$^2$ to about .175 oz/ft$^2$ |
| about .01" to about .035" | hot-dipped zinc spelter (thickness each surface) | .0005" to about .0015" |

A hot-dip zinc spelter galvanizing bath includes molten aluminum in a range from minor percentage by weight of less than two percent to high aluminum percentage Galvalume™. Hot dip galvanizing weights can be applied from about twenty-five to about one hundred fifty oz/ft$^2$, total both surfaces. A differential zinc-spelter coating weight can be provided on each surface dependent on market-usage; also, a light-weight zinc-spelter coating can be alloyed with the flat-rolled steel surface. Dual-function combined thermoplastic polymeric-materials coated on each surface of hot-dipped zinc-spelter protected flat-rolled steel provides long-term durability for market-usage in appliances, automotive and other transport vehicle industries, and the construction industry.

In FIG. 5, each corrosion-protected surface is coated with combined dual-function thermoplastic polymeric materials 88, 89; selected for inner tie-layer and exterior finish-layer portions as identified and described in the following tabulation:

TABLE II

| Location of Polymeric Layer | Polymeric Material | Temperature Activated-Surface for Coating |
|---|---|---|
| inner-located tie-layer | (i) ethylene-glycol modified PET | 230°–300° F. |
| | (ii) maleic anhydride-modified polyethylene | ambient. |
| exterior-located finish-layer | (i) combination PBT and PET (ii) PBT, or (iii) PET | can be coated at ambient temperature, and can be coated at temperature of the inner-located tie-layer |

The polymeric material selected for the inner tie-layer, and for the exterior finish-layer can differ on each surface. That selection can be at least in part based on market-usage, and exposure conditions during market-usage. Total combined polymeric coating thickness on each surface is preferably at least about one mil (0.001") in thickness of which about fifteen to about thirty-three and-a-third percent is the inner tie-layer; and, about sixty-six and two-thirds percent to about eighty-five percent is the externally-located finish-layer. Quantitative polymeric extrusion can be controlled on each metallic surface.

In FIG. 6, flat-rolled aluminum 90 can be selected in a thickness range of about 0.005" to about 0.25"; aluminum oxide provides an inorganic-metallic protective coating, which can be activated for polymeric adhesion. Other protective coatings 91, 92, are provided by selecting either chromizing, or chemical or electrochemical conversion coating or chromate coating. Protective coating 91, 92 can have a lighter-weight aluminum oxide coating, or a selected weight in a range about fifty to about six hundred micrograms per square foot for the other named protective coatings.

The dual-function polymeric materials indicated at 93, 94 of FIG. 6 are selected as identified in Table II and described earlier. The composite-coated flat-rolled aluminum sheet metal work product of FIG. 6 contributes formability, durability, and light weight where preferred for market-usage utility in the container industry, or for usage in construction calling for light-weight products for on-site fabrication, such as rain-gutters, and the like.

The aluminum/magnesium alloy 95 of FIG. 7 can be selected in a thickness range of about 0.0045" to about 0.2" with protective coating 96, 97 in the form of a lighter-weight oxide or selected as described for aluminum in FIG. 6; the latter having a weight in a range of about fifty to about six hundred micrograms per square foot. The combined extrusion dual-function polymeric materials 98, 99, for each corrosion-protected surface, are selected from those identified in TABLE II.

The relatively high tensile strength and impact resistance of the composite coated aluminum/magnesium alloy sheet metal of FIG. 7 increases utility and contributes performance for market usage products where high-strength and light-weight both play important roles, for example, in the fields of construction products used during construction, such as scaffolding, etc., and in the automotive and other transportation industries.

The described polymeric materials are available from:

1. E. I. du Pont de Nemours and Company
   Barley Mill Plaza
   Wilmington, DE 19880-0026
2. Eastman Chemical Company
   100 North Eastman Road
   P.O. Box 511
   Kingsport, TN 37662-5075
3. ATOFINA Chemicals, Inc.
   2000 Market Street
   Philadelphia, PA, 19103-3222
4. Basell USA
   2801 Centerville Road
   Wilmington, DE
5. Bayer Corporation
   100 Bayer Road
   Pittsburgh, PA 15205-9744

Open-flame burners, to size specifications for the line, are ordered from:
Flynn Burner Corporation
425 Fifth Avenue
(P.O. Box 431)
New Rochelle, N.Y. 10802

Corona discharge electrodes are ordered to specification from:
Enercon Industries Corp.
W140 N9572 Fountain Boulevard
Menomonee Falls, Wis. 53052

The polymeric extrusion apparatus, for the polymeric layers described above, can be ordered to specifications, considering line-speed, from:
Black Clawson Converting Machinery, LLC
46 North First Street
Fulton, N.Y. 13069

Specific values, dimensional relationships, combinations of materials, method steps, products and apparatus have been set forth for purposes of disclosing embodiments of the invention; however, it should be recognized that, in the light of those disclosures, others have been taught principles which enable making minor changes in those specifics, while continuing to rely on the teachings and principles of the accompanying disclosure. Therefore, for purposes of determining the patentable scope of the disclosed subject matter, reference should be made to the appended claims.

The invention claimed is:

1. A process for coating a metal sheet, comprising:
   A) in-line transporting a metal sheet having opposed substantially planar first and second surfaces extending between opposite lateral edges, the first surface having an inorganic-metallic protective coating extending between the lateral edges;
   B) activating a first metallic surface of the inorganic-metallic protective coating to enhance reception and retention of a multi-layer polymeric coating on the activated first metallic surface;
   C) melt co-extruding the multi-layer polymeric coating on the activated first metallic surface and beyond the opposite lateral edges to establish overhang portions, the multi-layer polymeric coating comprising
      (i) a polymeric tie layer contacting the activated first metallic surface in direct surface-to-surface contact, the tie layer comprising anhydride-modified polyethylene, while presenting the activated first surface at ambient temperature; and
      (ii) a polymeric finish layer in overlaying and coextensive relationship with the tie layer, the finish layer comprising a member selected from polybutylene terephthalate (PBT), polyethylene terephthalate (PET), and a combination of PBT and PET;
   D) solidifying the extruded multi-layer polymer coating, including the overhang portions; and
   E) subjecting the extruded multi-layer polymeric coating to finish-treatment, comprising heating the extruded multi-layer polymeric coating at least to a melt temperature thereof, then cooling the multi-layer polymeric coating through a glass-transition temperature thereof at a sufficiently rapid rate to establish amorphous non-directional characteristics in the multi-layer polymeric coating.

2. The process of claim 1, wherein said activating step (B) comprises a member selected from the group consisting of:
   (i) impinging an open-flame on the first metallic surface for burning-off light oil and surface debris, if any, while controlling chemical content of the flame for producing an oxidizing reaction on the first metallic surface causing loss of surface electrons,
   (ii) ionizing gas contiguous to the first metallic surface by corona-discharge for activating the first metallic surface; and
   (iii) a combination of (i) and (ii), in any order.

3. The process of claim 1, wherein said solidifying step (D) comprises removing heat from the polymeric coating by initially contacting the tie layer with the first metallic surface, and contacting the finish-layer with an in-line temperature-modulating surface.

4. The process of claim 1, further comprising:
   F) directing the metal sheet with the polymeric coating for assembly in a form suitable for transfer.

5. The process of claim 1, further comprising:
   F) trimming the solidified overhang portions.

6. The process of claim 5, further comprising:
   G) measuring thickness of the polymeric coating; and
   H) providing measured thickness as feedback data for controlling said melt co-extruding step (C).

7. The process of claim 1, wherein the metal sheet is selected from the group consisting of low-carbon steel, aluminum, and aluminum/magnesium alloy.

8. The process of claim 7, wherein the inorganic-metallic protective coating is selected from the group consisting of electrolytic-plated tin, electrolytic-plate chrome/chrome oxide, electrolytic-plated zinc, cathodic-dichromate, and hot-dip coated zinc spelter.

9. The process of claim 1, wherein:
   the metal sheet comprises a member selected from aluminum having at thickness gauge of about 0.005 inch to about 0.25 inch, and aluminum magnesium alloy having a thickness gauge of about 0.0045 inch to about 0.2 inch; and
   the inorganic-metallic protective coating comprises a member selected from surface oxidation, a chemical conversion coating, an electrochemical conversion coating, chromizing, and a chromate coating.

10. The process of claim 1, wherein:
    the metal sheet comprises flat-rolled low-carbon steel;
    the inorganic-metallic protective coating comprises hot-dip zinc spelter having a coating thickness in a range of about 0.0005 inch to about 0.0015 inch; and
    the finish-layer further comprises an antimicrobial agent selected from particulate copper, and particulate silver encased in zeolite.

11. The method of claim 1, wherein said in-line transporting step (A) moves the metal strip at a rate in a range of about 500 ft/min to about 800 ft/min.

12. A process for coating a metal sheet, comprising:
    A) in-line transporting a metal sheet having opposed substantially planar first and second surfaces extending between opposite lateral edges, the first and second surfaces having first and second inorganic-metallic protective coatings, respectively, extending between the lateral edges;
    B) activating a first metallic surface of the first inorganic metallic protective coating to enhance reception and retention of a first multi-layer polymeric coating on the activated first metallic surface;
    C) melt co-extruding the first multi-layer polymeric coating in direct surface-to-surface contact on the activated first metallic surface and beyond the opposite lateral edges to establish first overhang portions, the first multi-layer polymeric coating comprising
       (i) a first polymeric tie layer contacting the activated first metallic surface, the first tie layer comprising anhydride-modified polyethylene, while presenting the activated first metallic surface at ambient temperature;
       (ii) a first polymeric finish layer in overlaying and coextensive relationship with the first tie layer, the first finish layer comprising a member selected from polybutylene terephthalate (PBT), polyethylene terephthalate (PET), and a combination of PBT and PET;
    D) solidifying the extruded first multi-layer polymer coating, including the first overhang portions;
    E) activating a second metallic surface of the second inorganic metallic protective coating to enhance reception and retention of a second multi-layer polymeric coating on the activated second metallic surface;
    F) melt co-extruding the second multi-layer polymeric coating in direct surface-to-surface contact on the activated second metallic surface and beyond the opposite lateral edges to establish second overhang portions, the second multi-layer polymeric coating comprising
  (i) a second polymeric tie layer contacting the activated second metallic surface, the second tie layer comprising a member selected from
    (a) ethylene glycol modified PET, while presenting the activated second surface at a temperature in a range of about 230° F. and about 300° F.; and
    (b) anhydride-modified polyethylene, while presenting the activated second surface at ambient temperature;
  (ii) a second polymeric finish layer in overlaying and coextensive relationship with the second tie layer, the second finish layer comprising a member selected from
    (c) a combination of PBT and PET;
    (d) PBT; and
    (e) PET;
G) solidifying the extruded second multi-layer polymer coating, including the second overhang portions; and
H) subjecting the extruded multi-layer polymeric coatings to finish-treatment, comprising heating the extruded multi-layer polymeric coatings at least to a melt temperature thereof, then cooling the multi-layer polymeric coatings though a glass-transition temperature thereof at a sufficiently rapid rate to establish amorphous non-directional characteristics in the multi-layer polymeric coatings.

13. The process of claim 12, wherein said activating steps (B) and (E) comprise a member selected from the group consisting of:
  (i) impinging an open-flame on the first and second metallic surfaces for burning-off light oil and surface debris, if any, while controlling chemical content of the flame for producing an oxidizing reaction on the first and second metallic surfaces causing loss of surface electrons,
  (ii) ionizing gas contiguous to the first and second metallic surfaces by corona-discharge for activating the first and second metallic surfaces; and
  (iii) a combination of (i) and (ii), in any order.

14. The process of claim 12, wherein:
said solidifying step (D) comprises removing heat from the first polymeric coating by initially contacting the first tie layer with the first metallic surface, and contacting the first finish-layer with a first in-line temperature-modulating surface; and
said solidifying step (G) comprises removing heat from the second polymeric coating by initially contacting the second tie layer with the second surface, and contacting the second finish-layer with a second in-line temperature-modulating surface.

15. The process of claim 12, further comprising:
I) directing the metal sheet with the polymeric coatings for assembly in a form suitable for transfer.

16. The process of claim 12, further comprising:
I) trimming the first and second solidified overhang portions.

17. The process of claim 16, further comprising:
J) measuring thickness of the first and second polymeric coatings; and
K) providing measured thickness as feedback data for controlling said melt co-extruding steps (C) and (F).

18. The process of claim 12, wherein the metal sheet is selected from the group consisting of low-carbon steel, aluminum, and aluminum/magnesium alloy.

19. The process of claim 18, wherein the inorganic-metallic protective coatings are selected from the group consisting of electrolytic-plated tin, electrolytic-plate chrome/chrome oxide, electrolytic-plated zinc, cathodic-dichromate, and hot-dip coated zinc spelter.

20. The process of claim 12, wherein:
the metal sheet comprises a member selected from aluminum having at thickness gauge of about 0.005 inch to about 0.25 inch, and aluminum magnesium alloy having a thickness gauge of about 0.0045 inch to about 0.2 inch; and
the inorganic-metallic protective coatings comprise a member selected from surface oxidation, a chemical conversion coating, an electrochemical conversion coating, chromizing, and a chromate coating.

21. The process of claim 12, wherein:
the metal sheet comprises flat-rolled low-carbon steel;
the inorganic-metallic protective coatings comprise hot-dip zinc spelter having a coating thickness in a range of about 0.0005 inch to about 0.0015 inch; and
the first and second finish-layers further comprise an anti-microbial agent selected from particulate copper, and particulate silver encased in zeolite.

22. The method of claim 12, wherein said in-line transporting step (A) moves the metal strip at a rate in a range of about 500 ft/min to about 800 ft/min.

23. A process of composite coating an elongated flat-rolled sheet metal substrate, comprising:
  A) supplying an elongated flat-rolled rigid sheet metal substrate by selecting an inorganic-metallic protective coating for each of its pair of substantially-planar opposed surfaces which extend width-wise between longitudinally-extending lateral edges of said substrate,
  B) controlling substrate movement in the direction of its length; while activating a metallic surface of the inorganic-metallic protective coating on one of the surfaces of the substrate for enhancing adhesion of extruded molten thermoplastic polymeric material, with such surface-activation being selected from the group consisting of
    (i) impinging an open-flame on said metallic surface for burning-off light oil and surface debris, if any, while controlling chemical content of said flame for producing an oxidizing reaction on said metallic surface causing loss of surface electrons,
    (ii) ionizing gas contiguous to said metallic surface by corona-discharge for activating said metallic surface, and
    (iii) combinations of (i) and (ii), in any order;
  C) presenting said metallic surface for deposition of an extruded molten film of polymeric coating materials, including
    (i) a molten thermoplastic polymeric material tie-layer for first-contacting said activated metallic surface, comprising anhydride-modified polyethylene, while presenting said activated metallic surface at ambient temperature; and, further including
    (ii) a molten thermoplastic polymeric material finish-layer, in overlaying and co-extensive relationship with said tie-layer, selected from the group consisting of polybutylene terephthalate (PBT), polyethylene terephthalate (PET), and a combination of PBT and PET;
  D) preparing said selected polymeric coating materials as separately supplied for each said layer, by
    (i) heating said polymeric materials to melt temperature,
    (ii) pressurizing and continuing heating said molten polymeric materials, while (iii) combining said polymeric materials for simultaneous molten film extrusion;
E) controlling travel of said substrate in the direction of its length presenting said activated metallic surface;
F) extruding said molten-film polymeric materials under pressure on said activated metallic surface presented at ambient temperature, with
 (i) said tie-layer being inner-located for first-contacting said activated metallic surface in direct surface-to-surface contact, and with
 (ii) said finish-layer being externally located in overlapping and co-extensive relationship with said tie-layer;
G) depositing said molten film polymeric materials simultaneously to extend widthwise between lateral edges of said strip, and to extend further
 (i) forming a polymeric-overhang of said dual layers extending beyond each lateral edge of said activated metallic surface, followed by
 (ii) removing heat from said polymeric materials
  (a) by initial contact of said tie-layer with said metallic surface,
  (b) by contact of said finish-layer with an in-line temperature-modulating surface, including
  (c) controlling temperature of said in-line surface, for completing solidification of said polymeric materials; then
H) activating the metallic surface of the remaining inorganic metallic protective coating on the opposed substantially-planar surface of said elongated substrate while traveling in the direction of its length, by carrying-out said steps, as set forth in Paragraph B above, for enhancing adhesion of polymeric materials on said remaining activated metallic surface;
I) presenting said activated metallic surface for molten-film extrusion of thermoplastic polymeric materials, as set forth in Paragraph C) above; including
J) preparing said polymeric materials for extrusion as set forth in Paragraph D) above;
K) controlling travel of said substrate in the direction of its length, as set forth in Paragraph E above;
L) presenting said remaining activated metallic surface for molten-film extrusion coating by said molten polymeric materials, under pressure, as set forth in Paragraph F) above;
M) depositing said combined molten polymeric materials with respect to said remaining activated metallic surface and solidifying said layers as set forth in Paragraph G) above; followed by
N) remelting said dual-layer polymeric materials simultaneously on each said metallic surface while said substrate is traveling in the direction of its length; including the steps of
 (i) selecting a remelt temperature for both said polymeric layers on each metallic surface,
 (ii) providing for in-line travel of such substrate in the direction of its length substantially at said remelt temperature, prior to initiating cooling, so as to enable completing coverage by said first-contacting tie-layer with said inorganic-metallic topography of the protective coating on each substrate surface; and, also for
 (iii) augmenting interlinking of polymeric materials of said tie-layer and said external-finish layer, on each said opposed substrate surface; then
O) rapidly cooling said dual-layer polymeric materials substantially-simultaneously on both said opposed surfaces through glass transition temperature, resulting in
 (i) establishing amorphous characteristics in said polymeric coating materials on each said opposed surface, while also
 (ii) cooling said metal substrate to a temperature to avoid later raising said polymeric materials to a glass transition temperature; and
P) directing said elongated substrate, as composite coated on both surfaces, for assembly in a form suitable for transfer.

24. The process of claim 23, further including subsequent to solidification of said polymeric materials as associated with each respective metallic surface,
trimming said polymeric overhang as associated with each said metallic surface, and
measuring thickness of said dual-layer polymeric materials on each respective metallic surface for maintaining desired uniform coating on each said respective metallic surface.

25. The process of claim 24, comprising;
selecting flat-rolled rigid sheet metal substrate from the group consisting of
 (i) low-carbon steel,
 (ii) aluminum, and
 (iii) aluminum/magnesium alloy.

26. The process of claim 25, including
(a) selecting rigid flat-rolled low-carbon steel substrate having a thickness gauge in a range about 0.004" to about 0.015", and
(b) selecting an inorganic non-ferrous metallic protective coating, for each said opposed substantially-planar surface of said steel substrate, from the group consisting of:
electrolytic plated tin
electrolytic-plated chrome/chrome oxide
electrolytic-plated zinc
cathodic-dichromate, and
hot-dip coated zinc spelter.

27. The process of claim 25, including
(a) selecting rigid flat-rolled substrate, from the group consisting of
 (i) aluminum having a thickness gauge of about 0.005" to about 0.25"; and
 (ii) aluminum magnesium alloy having a thickness gauge of about 0.00451" and above 0.2", with
(b) an inorganic metallic protective coating for each opposed planar surface selected from the group consisting of
 (1) surface oxidation,
 (2) a chemical conversion coating,
 (3) an electrochemical conversion coating
 (4) chromizing, and
 (5) a chromate coating.

28. The process of claim 26, including
(a) selecting flat-rolled low-carbon steel substrate having a hot-dip zinc spelter coating, with spelter coating thickness being in the range of about 0.0005" to about 0.0015" total both surfaces, and, further
(b) selecting, for inclusion in said thermoplastic-polymeric material finish-layer, for at least one substrate surface, an antimicrobial agent selected from the group consisting of:
 (i) particulate copper, and
 (ii) particulate silver encased in zeolite.

* * * * *